Sept. 2, 1924. 1,507,268
B. G. ANDREWS ET AL
MEANS FOR TURNING AUTOMOBILE HEADLIGHTS
Original Filed Jan. 3, 1922 2 Sheets-Sheet 2
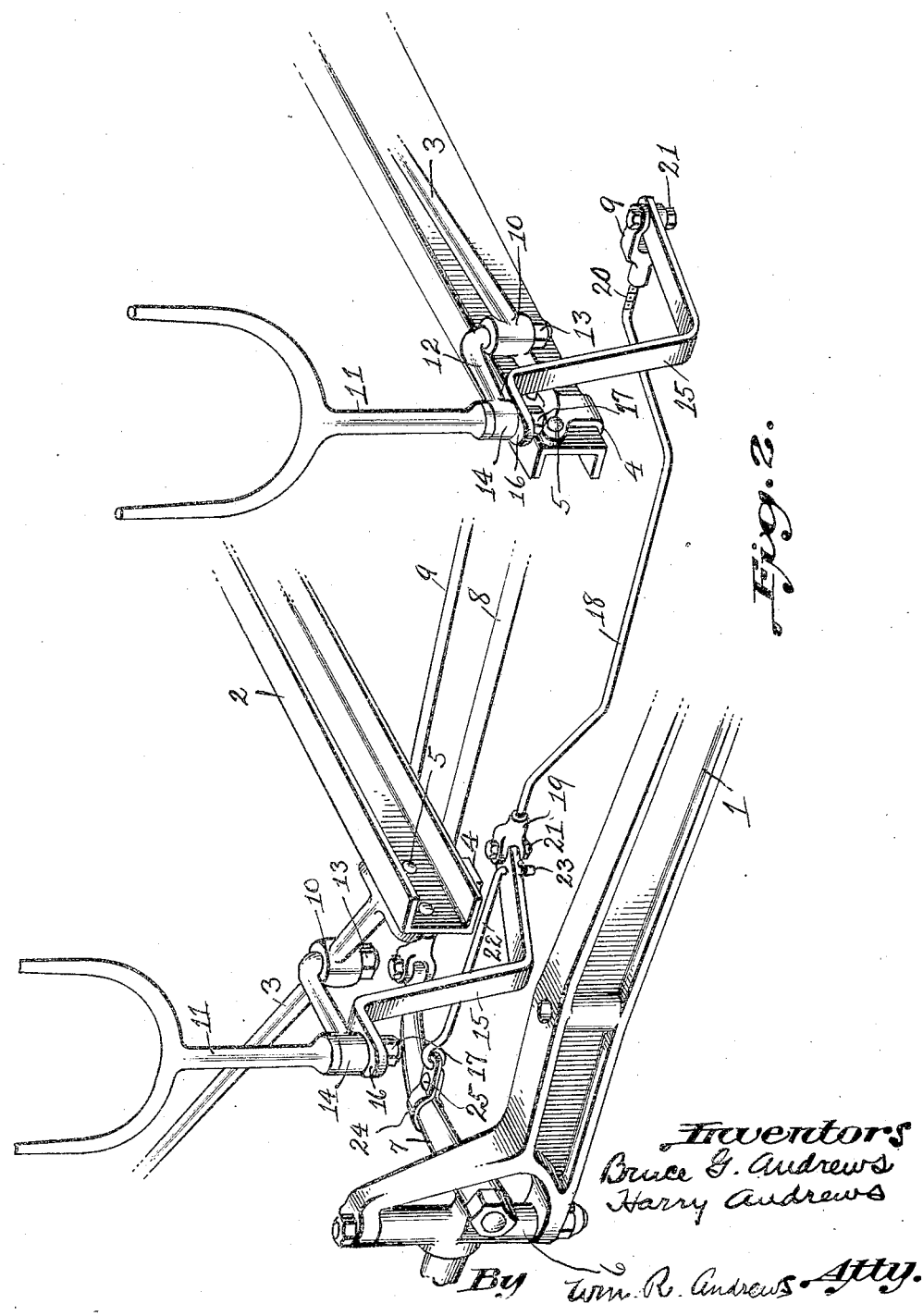

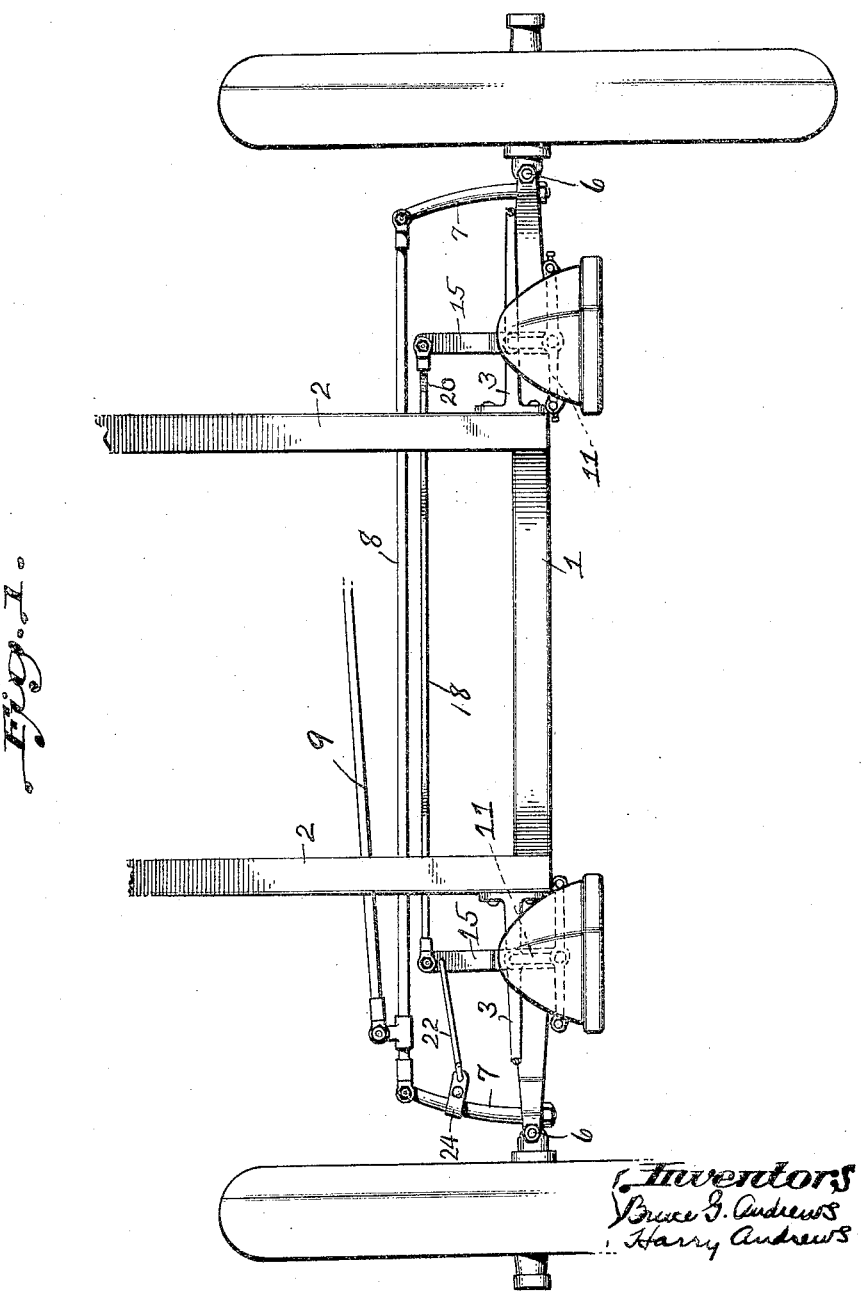

Patented Sept. 2, 1924.

1,507,268

UNITED STATES PATENT OFFICE.

BRUCE G. ANDREWS AND HARRY ANDREWS, OF YUMA, COLORADO.

MEANS FOR TURNING AUTOMOBILE HEADLIGHTS.

Application filed January 3, 1922, Serial No. 526,699. Renewed February 5, 1924.

*To all whom it may concern:*

Be it known that we, BRUCE G. ANDREWS and HARRY ANDREWS, citizens of the United States, residing at Yuma, in the county of Yuma and State of Colorado, have invented certain new and useful Improvements in Means for Turning Automobile Headlights, of which the following is a specification.

This invention relates to those headlights for automobiles which are adapted to automatically turn as the front steering wheels are turned in one direction or the other, so that the light from the lamps will always be projected in the direction in which the car is traveling, being particularly useful in rounding corners and making turns.

We are aware that it has been proposed to automatically turn the headlights or lamps of an automobile by connections of various kinds and we do not claim this idea broadly.

Our invention has particular reference to improvements adapted for use on the well known "Ford" car which will be adapted for application thereto quickly and expeditiously without requiring the drilling of holes or the attachment of special connections or brackets other than those features entering into the invention itself.

Our improvements are of such simple and novel construction and so adapted for use on the "Ford" car that they may be readily applied thereto by anyone by simply removing the ordinary lamp brackets or forks carried by the "Ford" car, inserting our improved brackets in the sockets formerly occupied by the lamp brackets, placing the lamp brackets or forks in our improved brackets and securing them to improved shifting arms comprising a part of our device and connecting our device to one of the steering arms of the "Ford" car.

Our improvements, therefore, comprise a self-contained combination of brackets, shifting arms, cross connecting rod and attaching means for operating the foregoing elements from the steering arm of one of the steering knuckles, as hereinafter set forth and claimed.

While our invention is particularly devised for use on a "Ford" automobile, we do not limit its use to that particular car and claim it for any car to which it is adapted to be attached.

In the accompanying drawings:

Figure 1 is a plan view showing the invention applied to a "Ford" automobile; and Fig. 2 is an enlarged perspective view of the invention applied to the chassis and steering arm, the axle, chassis, fender brackets and certain other parts being broken away and one of the steering knuckles and steering arms being omitted.

The front axle of a "Ford" card is shown at 1 and a part of the chassis appears at 2. The fender and light supporting brackets are shown at 3 and, as usual, they have ends or heads 4 which are suitably secured to the chassis as, for instance, at 5.

The steering knuckles appear at 6 and the steering arms which are connected thereto are shown at 7. These arms are connected by a cross head 8. The rod which is connected to the steering column appears at 9.

The "Ford" car has its fender supporting rods 3 provided with integral sockets 10 in which the lamp brackets or forks 11 are ordinarily tightly secured.

Our improvements comprise a novel combination of parts now to be described.

Secured in the sockets 10 are L-shaped brackets 12. The forks or lamp brackets 11 having first been removed from the sockets 10, the L-shaped brackets 12 are fitted in the sockets 10 and rigidly secured thereto in parallel relation to each other by nuts 13 carried by the screw threaded parts of said brackets and bearing against the bottoms of the sockets 10.

The displaced or removed lamp brackets 11 are now rotatably or loosely mounted in the eyes 14 at the forward ends of the brackets 12.

We provide Z-shaped shifting arms 15 which have openings in their upper ends 16 to tightly receive the lower ends of the lamp brackets 11, the usual nuts 17 on said brackets being used to secure the brackets 11 to the arms 15 so that as the arms 15 are moved, the brackets 11 will turn accordingly and the lamps carried by the brackets will face one way or the other, or straight ahead, according to the extent of turning of the arms 15.

The arms 15 are simultaneously turned by a cross connecting rod 18 which is connected at both ends to said arms 15 by stirrups 19, one or both of which may have a screw threaded connection 20 for the rod 18 so that the requisite adjustment can be obtained to bring the arms 15 into parallelism. The stirrups 19 are connected to the arms 15 by pivot bolts 21. If preferred, instead of employing two stirrups 19, one end of the rod 18 may be bent and inserted in a hole in the arm 15, a suitable cotter being used to retain the bent end.

For the purpose of shifting the arms 15, there is provided a connection between one of said arms and a steering arm 7. The connection we preferably employ comprises a rod 22 having a bent end 23 received in a hole in the arm 15 and secured by a nut or cotter, and a clamp 24 which embraces the steering arm 7. The clamp is provided with a bolt 25 by which it may be clamped at any point of the length of the arm 7. The clamp is thus adjustable along the arm 7 so that the extent of the swing of the arms 15 may be predetermined, as desired. It will be understood that as the arms 7 move during the steering of the car, the brackets 11 will be correspondingly turned in the eyes 14.

We claim:

Headlight turning means for an automobile which is provided with the usual fender brackets or rods having sockets for the lamp forks, comprising L-shaped brackets each having a leg received in one of the aforesaid sockets and rigidly secured thereto against movement and its other leg provided with a vertically arranged bearing-eye, the usual lamp supporting brackets or forks having their shanks directly fitting, and rotatably mounted in, said eyes, Z-shaped shifting arms secured to the lower ends of the shanks of said lamp supporting brackets or forks, a cross rod pivotally connected to the shifting arms to cause them to move in unison, a clamp embracing the arm of one of the steering knuckles, said clamp being shiftable to different positions along said arm, and a rod pivotally connecting the clamp to one of the Z-shaped shifting arms for the lamp brackets or forks, whereby movements of the arm of said steering knuckle are imparted to the shifting arms and lamp brackets or forks to cause the lamp brackets or forks to turn.

In testimony whereof we affix our signatures.

BRUCE G. ANDREWS.
HARRY ANDREWS